Dec. 15, 1964    J. M. MILLER ETAL    3,161,266
NUCLEAR REACTOR INSULATION
Filed Oct. 26, 1959    3 Sheets-Sheet 1
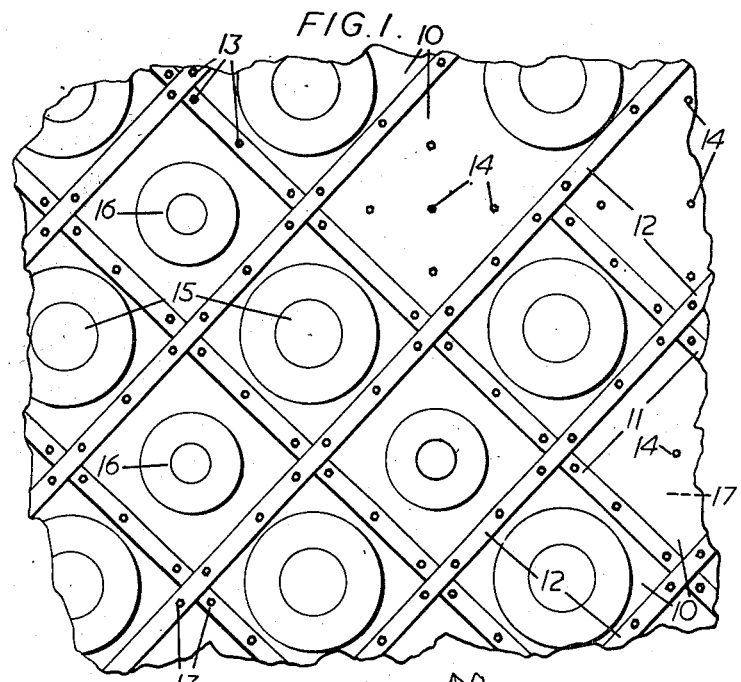
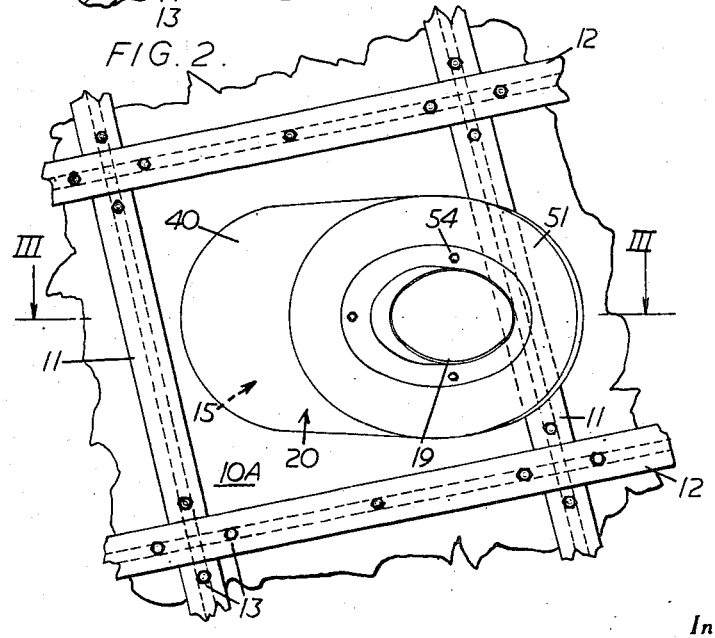
*Inventors*
Thomas Ferlie Dryden
John Mathewson Miller
*Attorney*

Dec. 15, 1964   J. M. MILLER ETAL   3,161,266
NUCLEAR REACTOR INSULATION
Filed Oct. 26, 1959   3 Sheets-Sheet 2
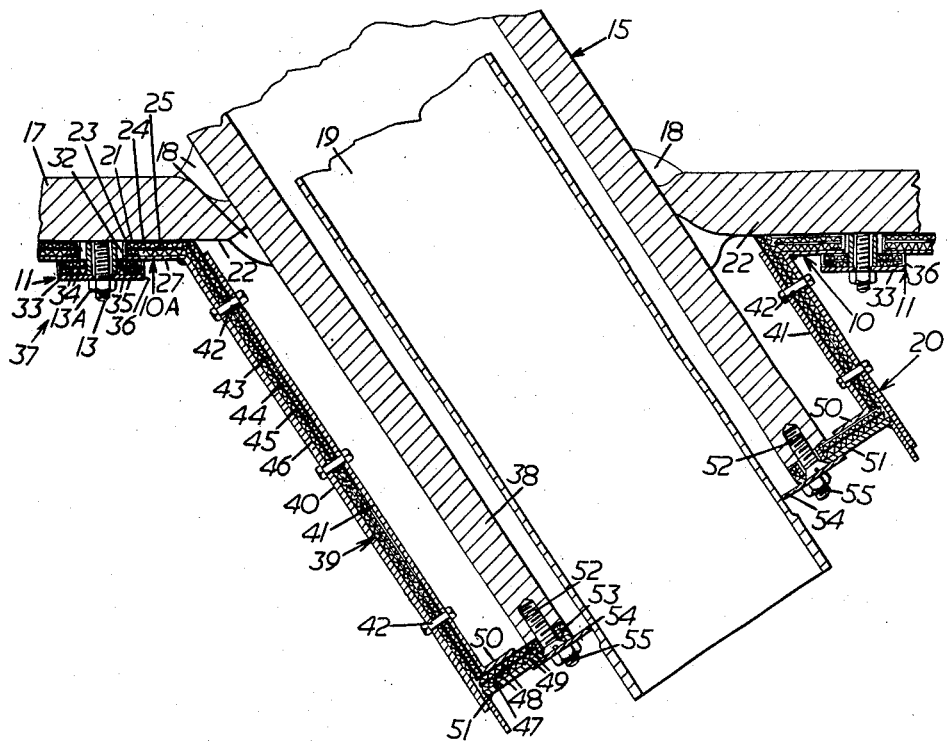
FIG. 3.
Inventors
Thomas Ferlie Dryden
John Mathewson Miller
Attorney

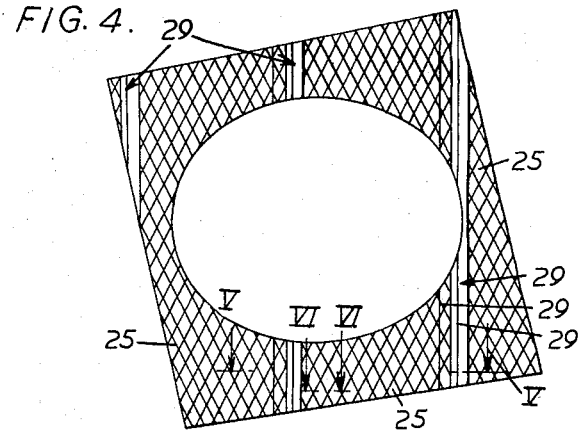
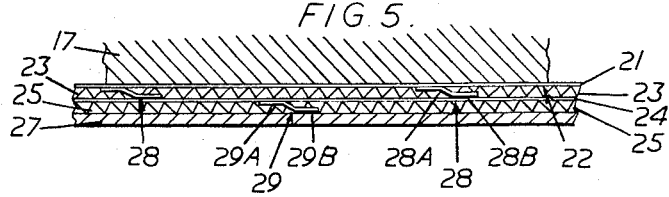
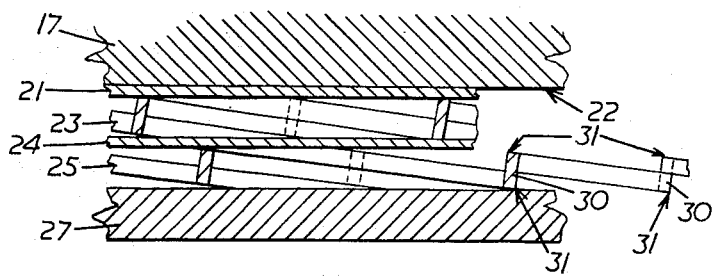
Inventors
Thomas Ferlie Dryden
John Mathewson Miller
*Attorney*

United States Patent Office 3,161,266
Patented Dec. 15, 1964

3,161,266
NUCLEAR REACTOR INSULATION
John M. Miller, and Thomas F. Dryden, London, England, assignors to Babcock & Wilcox Limited, London, England, a British company
Filed Oct. 26, 1959, Ser. No. 848,868
8 Claims. (Cl. 189—34)

This invention relates to thermal insulation and more particularly to insulation suitable for application to internal surfaces of reactor pressure vessels. Thermal insulation applied internally to a reactor pressure vessel serves not only to reduce loss of heat and thereby to improve efficiency, but also to reduce the maximum temperature which the pressure vessel is liable to attain and limit the possible temperature gradients in the vessel walls. Since the requisite wall thickness is affected thereby and possibly also the practicable size and weight of the vessel, it is important that the effectiveness of the insulation shall be as great as possible. Requisites of acceptable insulation are that there shall be no resultant contamination of the coolant by dust or the like and that the insulation shall be effective throughout the life of the reactor. The insulation must, therefore, be able to withstand the temperature and temperature changes inherent in the operation of the nuclear reactor, it must be resistant to chemical attack by the coolant and it must suffer no significant changes in property due to irradiation. These requirements strictly limit the available materials and lead to the consideration of metallic insulation. The use of metal as an insulating medium, however, presents the difficulty that the material of the insulation possesses relatively high heat conductivity and the effectiveness of metallic insulation on upright or sloping surfaces is liable to be adversely affected by heat transfer through convection.

The present invention includes thermal insulation including a thin metal sheet, spacing means in the form of expanded metal at least at one side of the sheet, the expanded metal at the side of the sheet being adapted to space the sheet from a surface opposed to the side of the sheet and to effect substantially point contact with the sheet and with the surface, the points for contacting the sheet being displaced laterally with respect to the points for contacting the surface.

The present invention also includes thermal insulation including a thin metal sheet, spacing means adapted to space the sheet from a surface opposed to a side of the sheet and in the form of expanded metal arranged to effect point or substantially point contact with the sheet and with the surface, the points for contacting the sheet being displaced laterally with respect to the points for contacting the surface, and sealing means such as strips or tongues adapted to sectionalise the gaps between the surface and the said side of the sheet and act as barrier means opposing the flow of fluid along the gap transversely of the strips or tongues.

Preferably, there are a plurality of thin metal sheets spaced apart by expanded metal, and sealing means are provided between adjacent sheets.

Embodiments of the invention will now be described, by way of example, with reference to the accompanying drawings in which:

FIGURE 1 is a view showing part of the insulated inner surface of the upper region of a nuclear reactor pressure vessel.

FIGURE 2 is a fragmentary view from the centre of the pressure vessel showing one of the fuel-element charge nozzles which extend into the vessel.

FIGURE 3 is a vertical section through the line III—III of FIGURE 2, on an enlarged scale.

FIGURE 4 is a detail plan illustrating thermal insulation shown in FIGURE 3.

FIGURE 5 is a section on the line V—V of FIGURE 4, and

FIGURE 6 is an enlarged section on the line VI—VI of FIGURE 4.

Referring to FIGURE 1, the upper region of the inner surface of the pressure vessel is thermally insulated by a plurality of panels 10 which are attached to said surface by means including short insulated strips 11 and long insulated strips 12, and by bolts 13 and 14, as hereinafter described. Fuel-element charge nozzles 15 and control rod nozzles 16 extend through the vessel wall and through panels of thermal insulation shaped to fit around the nozzles which are themselves thermally insulated.

A charge nozzle 15 as shown in more detail in FIGURES 2 and 3, extends through the vessel wall 17 and is secured in position by welding 18. The inner tube 19 of the nozzle is secured in position as described in copending British patent application No. 4220/59. A panel 10A of insulation through which the nozzle extends is of the shape shown in FIGURE 4, and the inward extension of the nozzle is surrounded by a covering 20 of thermal insulation.

The panel 10A of insulation comprises a first thin metal sheet 21 in engagement with the pressure vessel surface 22, bands 23 of expanded metal spot-welded to the sheet 21, a second thin metal sheet 24, bands 25 of expanded metal spot-welded to the sheet 24, a metal plate 27, and sealing strips 28 and 29 between adjacent bands 23 and 25, respectively. The sealing strips 28 and 29 are of generally Z-shaped cross-section and their outer limbs 28A and 29A are spot-welded to sheets 21 and 24, respectively. The inner limbs 28B and 29B engage the sheet 24 and the plate 27, respectively, so that the strips sectionalise the gaps between the sheets and between sheet 24 and the plate 27 and so prevent fluid flow through the gaps in a direction transversely of the strips. The strips are arranged horizontally so that, in the completed pressure vessel, upward flow of fluid through the insulation towards the top of the spherical vessel is at least mitigated.

As can best be seen from FIGURES 5 and 6, the expanded metal, which is formed by stretching a slotted metal sheet, is of the type in which the intersections 30 in the metal network are turned, and this results in the provision of laterally displaced points 31 on the two faces of each band. Thus, when the insulation is pressed towards the inner surface 22 of the vessel wall 17, the points 31 on bands 23 engage sheets 21 and 24, and the points 31 on bands 25 engage sheet 24 and plate 27. Also, of course, the strips 28 and 29 are pressed into close engagement with the surfaces between which they are sandwiched, the strips preferably being resilient so that the limbs 28B and 29B tend to follow irregularities in the surfaces which they engage. Thus, two layers of diamond-shaped pockets of substantially still fluid are maintained between the surface 22 and the plate 27 while only substantially point contacts exist between the surface and the plate and only tortuous paths exist for conduction of internal heat to the wall 17.

The edges of the panel of insulation are provided with closing strips 32 which are suitably formed by the bending over of a peripheral extension of sheet 21.

Short insulated strips 11 and long insulated strips 12 hold the panel 10A and adjacent panels in position, pressed against the surface 22. Each strip 11 comprises an elongated plate 33 pressed towards surface 22 by nuts 13A on one of the studs 13. Sandwiched between the plate 33 and the adjacent panel plates such as plate 27 is insulation comprising two lengths 34 of expanded metal of the type described above spot-welded to thin metal sheets 35. Closing strips 36 are formed by the bending over of extensions of the outer sheet 35, which are then spot-welded in position. A tubular distance piece 37 surrounds each stud stem to engage surface 22 and plate 33 to prevent crushing of the insulation. The strips 11 extend between the longer strips 12 which are of similar construction.

Around the inner projection 38 of the nozzle a cylindrical section 39 of insulation is provided. This insulation is formed in two similar semi-cylindrical parts which are secured in position within a metal sleeve 40 by means of four metal clamping strips 41 which are secured to the sleeve 40 by bolts 42. The insulation comprises an inner sheet 43 of thin metal, an inner layer 44 of expanded metal spot-welded to the sheet 43, an outer sheet 45 of thin metal, and an outer layer 46 of expanded metal spot-welded to the sheet 45.

The inner end of the nozzle is also provided with thermal insulation 47. The insulation which is formed in two similar sections is of flat annular form and comprises inner and outer sheets 48 of thin metal and inner and outer layers 49 of expanded metal of the type aforesaid. The insulation is clamped between the inner end of the nozzle 15 and flanges 50 on strips 41, and a two-part annular plate 51 which is held in position by four headed screws 52 which enter the nozzle tube wall. Tubular distance pieces 53 are provided to prevent crushing of the insulation. A two-part sealing plate 54 is secured to the end cover by means of studs 55, the plate 54 fitting closely around the inner tube 19.

It has been found suitable to use as expanded metal "No. 5 Expamet" which is formed from 18 S.W.G. stainless steel and has diamond shaped openings the diagonals of which are approximately 1½ inches and 3 inches. The breadth of the strips forming the mesh is approximately $3/32$ inch and the depth between the points 31 on opposite faces is $5/16$ inch. The thin metal sheets are suitably formed from 28 S.W.G. stainless steel. It will be appreciated that the dimensions of the parts may be altered as required.

The insulation hereinbefore described comprises two thin metal sheets each having a layer of expanded metal secured to one side thereof. However, a single metal sheet provided with expanded metal on one or both sides, or more than two sheets each having expanded metal provided on a side thereof, may be preferable in some cases.

It will also be appreciated that the panels of insulation may be prefabricated and adjusted as necessary on site or may be fabricated on site as required.

We claim:

1. Thermal insulation including a thin metal sheet, a second sheet having a surface spaced from and opposed to one surface of said thin metal sheet, an expanded metal sheet disposed between said first two sheets and consisting of integrally joined bands defining open areas and having diagonally opposed spaced terminal points contacting the opposed surfaces of said sheets, the faces of said bands being angularly displaced from a line normal to the sheets to provide a tortuous heat conductive path between said sheets.

2. Thermal insulation as claimed in claim 1, wherein there are a plurality of thin metal sheets spaced apart by expanded metal.

3. Thermal insulation including a thin metal sheet, spacing means adapted to space the sheet from a surface opposed to a side of the sheet and in the form of expanded metal arranged to effect point contact with the sheet and with the surface, the points for contacting the sheet being displaced laterally with respect to the points for contacting the surface, and resilient sealing means adapted to sectionalise the gap between the surface and the said side of the sheet and act as barrier means opposing the flow of fluid along the gap transversely of the resilient sealing means.

4. Thermal insulation as claimed in claim 3, wherein there are a plurality of thin metal sheets spaced apart by expanded metal and sealing means are provided between adjacent sheets.

5. Thermal insulation as claimed in claim 3, in which the expanded metal comprises parallel bands and the sealing means are provided at the junction between adjacent bands.

6. Thermal insulation as claimed in claim 5, in which the sealing means comprise one or more metal strips of generally Z-shaped tranverse section, the strip passing between the edges of adjacent bands and extending under one end and over the other edge.

7. A panel of thermal insulation as claimed in claim 3, in which a sealing strip is provided round at least part of the periphery of the panel.

8. Thermal insulation for a metallic surface of a vessel containing a high temperature fluid comprising a thin metal sheet having a surface arranged in spaced relation to said metallic surface, and a series of thin imperforate metallic sealing plates flexibly mounted and spaced along one of said surfaces and extending at an acute angle thereto towards said opposite surface to sectionalize the space between said thin metal sheet and said metallic surface and act as a barrier means opposing the flow of fluid through said space transversely of said sealing plates.

References Cited in the file of this patent

UNITED STATES PATENTS

| 1,576,559 | Swift | Mar. 16, 1926 |
| 1,741,366 | Hurxthal | Dec. 21, 1929 |
| 1,930,285 | Robinson | Oct. 10, 1933 |
| 2,001,632 | Schlichting | May 14, 1935 |
| 2,384,157 | Burke | Sept. 4, 1945 |
| 2,540,331 | Hlavaty | Feb. 6, 1951 |
| 2,543,970 | Horsfall et al. | Mar. 6, 1951 |
| 2,720,948 | Pajak | Oct. 18, 1955 |

FOREIGN PATENTS

| 565,053 | Great Britain | Oct. 25, 1944 |